(12) United States Patent
Jones (10) Patent No.: US 6,889,420 B2
(45) Date of Patent: May 10, 2005

(54) METHOD FOR MAKING A STATOR FOR AN ELECTRIC MACHINE

(76) Inventor: Robert M. Jones, 23 N. Washington St., Norton, MA (US) 02766

(*) Notice: Subject to any disclaimer, the term of this patent is extended or adjusted under 35 U.S.C. 154(b) by 298 days.

(21) Appl. No.: 10/285,384

(22) Filed: Oct. 30, 2002

(65) Prior Publication Data

US 2003/0173857 A1 Sep. 18, 2003

Related U.S. Application Data

(63) Continuation-in-part of application No. 09/605,157, filed on Jun. 28, 2000, now Pat. No. 6,538,356.

(51) Int. Cl.[7] .................... H02K 15/00; H02K 15/14; H02K 15/16
(52) U.S. Cl. .................... 29/596; 29/597; 29/598; 29/607; 29/609; 310/201; 310/216; 310/254
(58) Field of Search ................ 29/596, 597, 598, 29/607, 609; 310/201, 216, 254

(56) References Cited

U.S. PATENT DOCUMENTS

| | | | |
|---|---|---|---|
| 1,512,693 A | | 10/1924 | Juillard |
| 4,039,875 A | | 8/1977 | Morreale |
| 4,115,915 A | * | 9/1978 | Godfrey .................. 29/596 |
| 4,689,023 A | | 8/1987 | Strong, III et al. |
| 5,331,244 A | * | 7/1994 | Rabe .................... 310/180 |
| 5,804,902 A | * | 9/1998 | Hill ..................... 310/179 |

FOREIGN PATENT DOCUMENTS

| | | |
|---|---|---|
| GB | 1038011 | 7/1963 |
| JP | 61203839 | 9/1986 |

* cited by examiner

*Primary Examiner*—Carl J. Arbes
*Assistant Examiner*—Tim Phan
(74) *Attorney, Agent, or Firm*—Hamilton, Brook, Smith & Reynolds, P.C.

(57) ABSTRACT

An electric machine such as a direct current motor or generator in which a stator is formed using a set of electrically conductive blade structures disposed about an inner axis of a stator core. Electrical interconnections between the conductive blades are provided by a set of disks connected to the ends of the blades. The disks are formed preferably from an insulating substrate material having electrically conductive pads formed thereon to provide circuit interconnections between the blades. A desired path for current flow is provided by arranging the blades and conductive pads on the disks appropriately in the desired number of turns and phases. The conductive blades and conductive portions of the interconnect disks are formed, in a preferred embodiment, from a material such as a copper and molybdenum laminate.

12 Claims, 12 Drawing Sheets

METHOD FOR MAKING A STATOR FOR AN ELECTRIC MACHINE

RELATED APPLICATION(S)

This application is a Continuation-in-Part of U.S. application Ser. No. 09/605,157 filed Jun. 28, 2000 now U.S. Pat. No. 6,538,356, the entire teaching of which is incorporated herein by reference.

BACKGROUND OF THE INVENTION

The present invention relates to an electric machine such as a motor or generator of the induction type.

A motor is an electromechanical device which converts electrical energy, delivered in the form of voltages or currents, into mechanical energy that is represented as rotational movement. One common type of motor consists of two major elements, a stator and a rotor. The stator typically includes a wire coil having a number of windings. The rotor typically includes permanent magnets. The rotor and stator are mechanically arranged such that the rotor can move freely with respect to the fixed stator. Electromagnetic interaction between the stator and rotor then causes the rotor to move for each polarity change in the stator windings. Other types of electric machines such as generators may be constructed in a similar fashion.

In one type of motor, the stator is formed by laminating a number of disks formed of a ferrous material to provide a cylindrical stator housing. The core disks have formed therein tabs or tines that provide a structure around which are wrapped bare copper wire strands to form the windings. The stator housing provides a coaxial located open space into which is inserted the rotor assembly. The rotor assembly typically is made from a number of electromagnets spaced about a shaft. Typically, the magnets are contained or held with the shaft by an outer sleeve. The rotor assembly is rotatably supported mechanically within the stator housing by low friction bearings.

SUMMARY OF THE INVENTION

Such motors have been widely accepted in industry for precision control applications, and they are presumably considered to perform reasonably well for their intended purpose. However, they are not without their shortcomings.

It would be desirable to eliminate the need to provide for a number of windings in the stator assembly from a manufacturing perspective.

It would also be desirable if the power generation or torque capability of a motor of a given size and weight could be increased.

Furthermore, the reliability of such motors could be improved, given that in extended use the wire windings of the rotors may sometimes tend to short or wear out.

The present invention is an electric machine, such as a brushless motor, in which the coil is formed by a set of electrically conductive blade structures disposed about an axis of a stator core. Electrical interconnections between the blades are provided by a set of disks mounted to the ends of the blades. The disks electrically connect the blades in a correct circuit orientation to provide a desired number of turns and phases for the machine.

The number of phases and number of turns associated with the motor may be changed by changing the circuit arrangement of the interconnect disks.

The non-conductive portions of the interconnect disks may be provided by a ceramic or other alumina material.

The blades and conductive portions of the interconnect disks are preferably formed from a material such as a copper and molybdenum laminate.

The outer layers of the blades may have a portion thereof which mechanically contacts a back iron structure of the stator assembly, to provide a rigid, rugged stator structure. In such a configuration, an insulating material is also formed along the blades to prevent the blades from shorting to the back iron.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

Figure 1A:
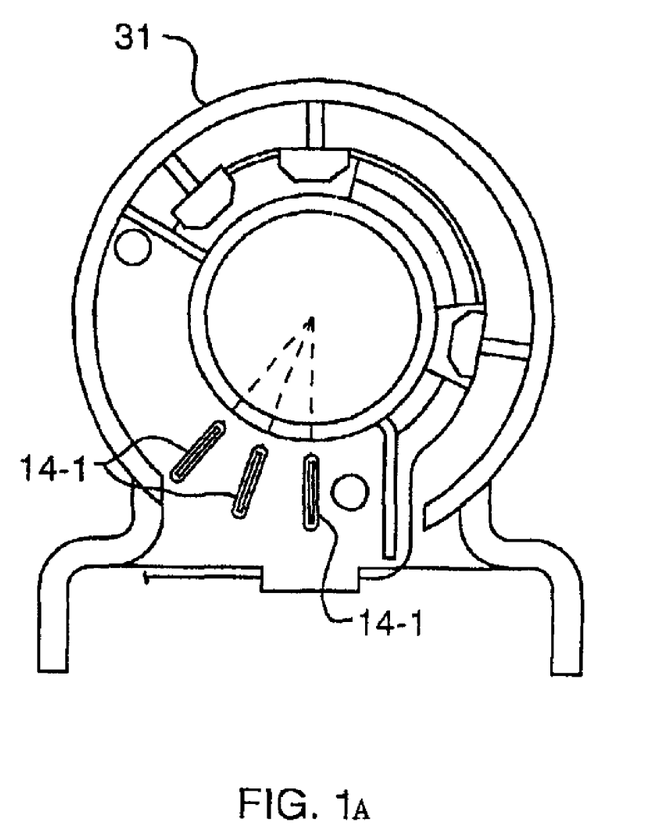
FIG. 1A is an end view of a electric machine such as a brushless direct current motor constructed according to the invention.
Figure 1B:
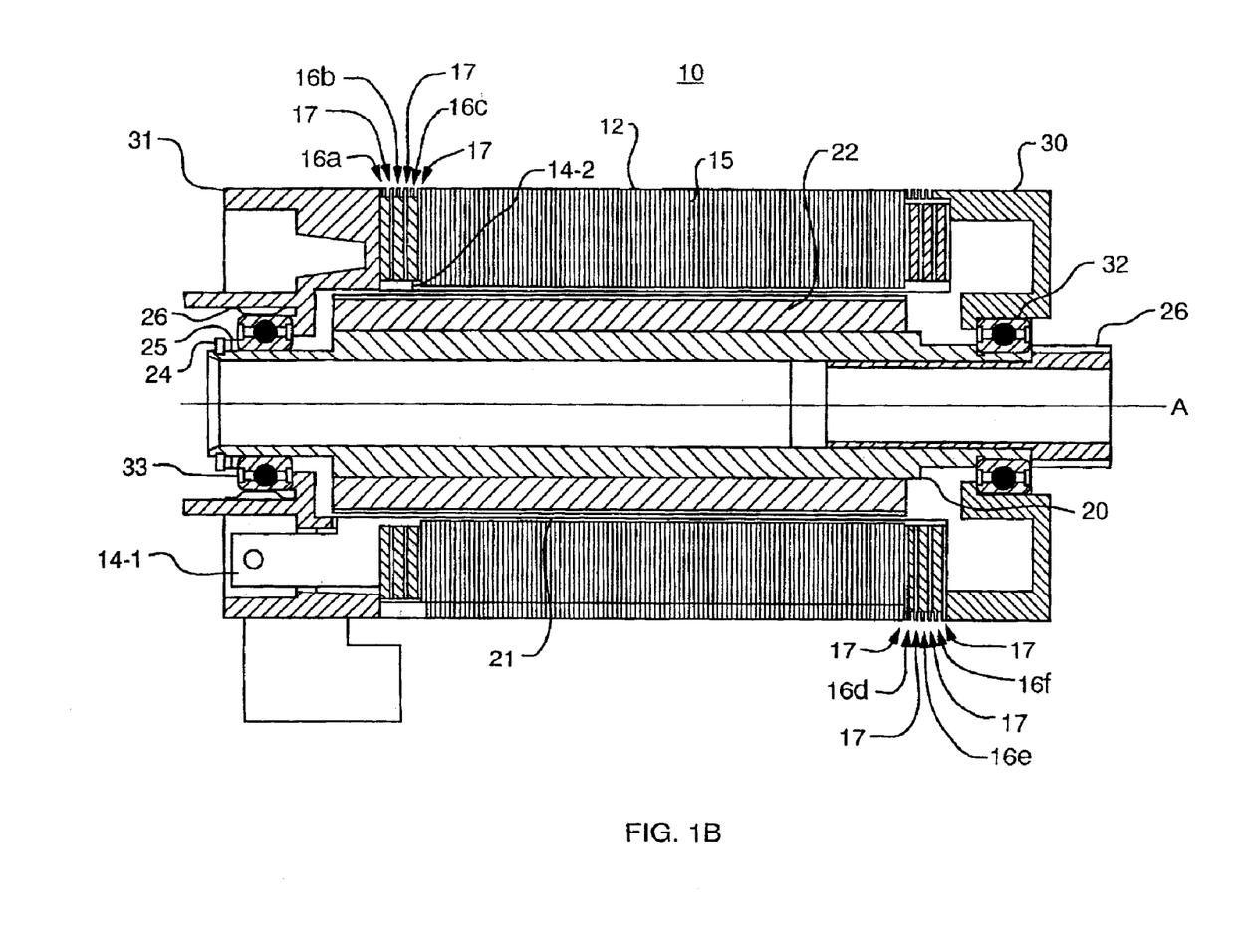
FIG. 1B is a cross-section view of the motor.

FIGS. 1A and 1B illustrate, respectively, an end view and cross-section view of an electric motor 10 which, according to the invention, uses a stator assembly 12 that makes use of interconnect blades 14 and disks 16 to provide the stator windings.

More particularly, the motor 10 includes a stator assembly 12 and rotor assembly 20. The motor 10 is of the inside rotor type in which the rotor 20 is disposed along a central axis A to turn inside of the stator 12. The rotor 20 and stator 12 assemblies are held in position by a front motor housing 30 and rear motor housing 31. The housings 30 and 31, which may be formed of aluminum, steel or other suitable metal, rotatably secure the rotor assembly 20 through front and rear bearings 32 and 33.

The rotor assembly 20 consists of an outer sleeve 21, an inner rotor shaft 22, magnet bars 23, retaining rings 24, washers 25, tolerance rings 26, and pinion 27. The rotor assembly 20, which is well known in the art, uses the outer rotor sleeve 21 to retain a number of magnet bars 23 along the length thereof. The retaining rings 24 and washers 25 keep the rotor assembly 20 positioned within the bearings 32 and 33. A tolerance ring 26 may be inserted between the rear bearing 33 and the sidewall of the rear motor housing 31 to make the seating of the bearing 33 less critical. The pinion 27 is inserted in the front end of the rotor shaft 22 and typically couples mechanically to the device be driven by the motor 10.

Of particular interest to the present invention is the construction of the stator assembly 12, which consists of a number of blades 14 extending along the length of the stator 12, back iron washers 15, interconnect disks 16, and insulator disks 17.

Figure 2A:
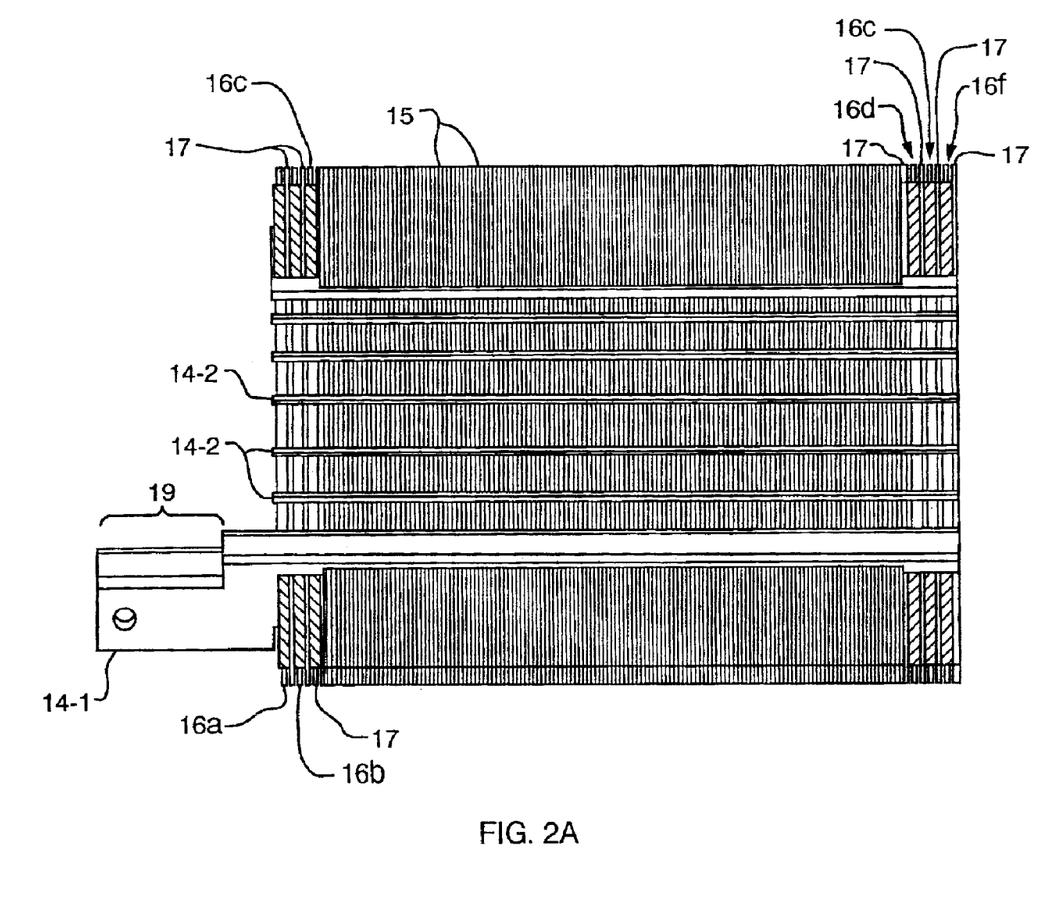
FIG. 2A is a more detailed cross-section of the stator assembly and the rotor.
Figure 2B:
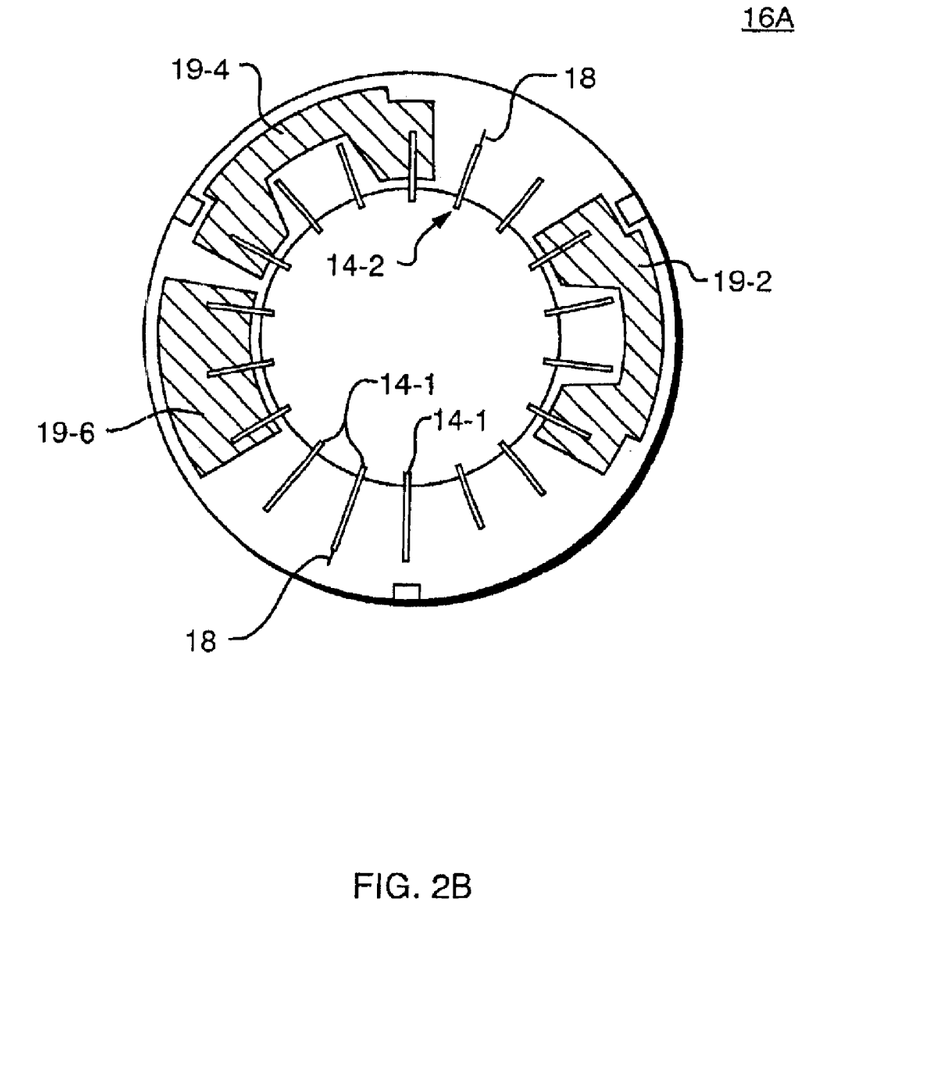
FIG. 2B is a plan view of one of the interconnect disks.

FIGS. 2A and 2B show the stator assembly 12 in more detail. The stator 12 includes a frame built up from a number of back iron washers 15 that are laminated together. The back iron washers 15 are formed of a nickle-iron alloy or other suitable ferrous material. The laminations help reduce eddy currents in the stator 12. On either end of the back iron washer 15 assembly are a series of interconnect disks 16 spaced apart by insulator disks 17.

A particular one of the interconnect disks 16A is shown in the plan view of FIG. 2B. As can be seen best in this view, the interconnect disk 16A is formed of an annular ring of insulating material, such as a ceramic containing 96% alumina.

The inner circumference of the disk 16A has formed therein a number of slots 18 within which are placed the blades 14. In the illustrated configuration, there are a total number of eighteen slots 18 around the inner circumference.

The blade pieces 14 actually are provided as two types, a stepped blade piece 14-1 and straight blade piece 14-2. Most of the pieces are of the straight blade 14-2 variety; there are however three stepped blade pieces 14-1 provided in the illustrated embodiment. The three stepped blades 14-1 correspond to each of the three phases of the windings of the stator assembly 12. As mentioned previously, the blade pieces 14 are formed of a suitable conductive material such as a copper-molybdenum laminate.

The blade pieces 14-1 and 14-2 serve as current conductors to take the place of more typical winding wires found in a stator. Operating in conjunction with conductive metalization layers formed in a particular pattern on the various interconnect disks 16, the blades 14 provide circuit paths for current flow and thus serve as the various winding phases of the motor 10.

Figure 3:
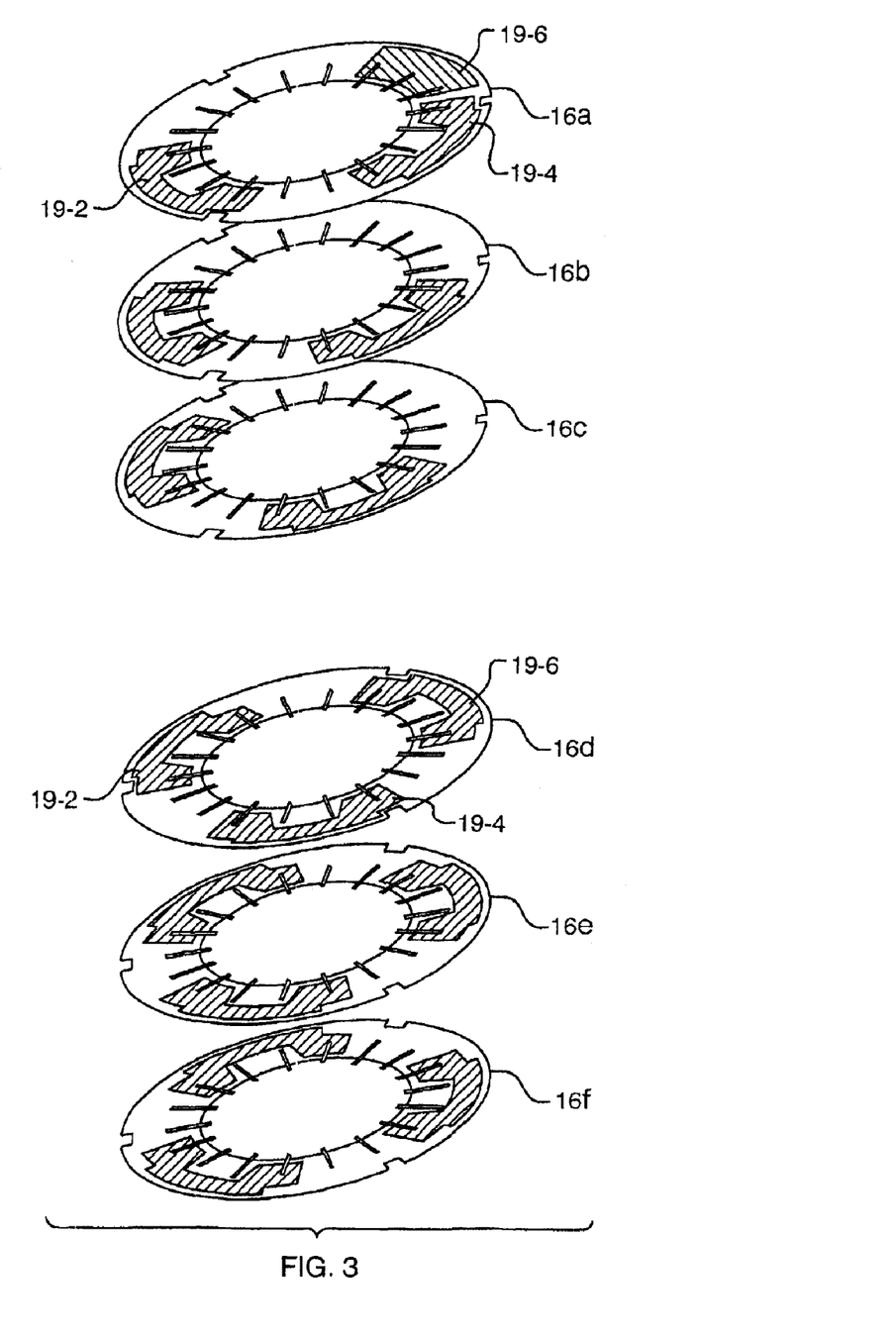
FIG. 3 is an exploded view showing the arrangement of interconnect disks for a single turn, three phase motor illustrating how the disks and blades provide the motor windings.

Turning attention now to FIG. 3, an exploded view of the interconnect disks 16 illustrates the manner in which the blades 14-1 and 14-2 are electrically interconnected. (The blades 14-1 and 14-2 are not shown in FIG. 3 for clarity.) In general, a given blade 14 carries current from one end of the stator 12 to the other; the interconnect disks 16 serve as "end turns," causing the current received from one blade 14 to reverse direction, and then return down the stator in the opposite direction.

Each stepped blade piece 14-1 provides an end tab 19 which is brought out from the stator assembly 12 to provide an interconnection to one of the three phase drive signals required.

In the illustrated configuration, three interconnect disks 16A, 16B and 16C are disposed at the rear end of the stator assembly 12. Three other interconnect disks 16D, 16E, and 16F are placed at the front end of the stator assembly 12. The lines with arrows indicate the current flow from and through the various interconnect disks 16 and metalization layers formed thereon.

For example, consider the current path for one phase of the windings. Starting at interconnect disk 16A, there is a slot 18-1 associated with a corresponding stepped blade piece 14-1 that provides the input current. The blade piece 14-1 is inserted in slots 18-1 that are located in a corresponding radial location in each of the five other disks 16B through 16F.

Current enters the stator assembly 12 at the stepped blade piece 14-1 positioned in slot 18-1. The slot 18-1 is formed in a portion of the interconnect disk 16A that has only ceramic and no conductive metalization surrounding it. Therefore, the current continues to pass along the blade piece 14-1 to the next disk 16B.

At disk 16B is encountered another slot 18-1 which has no metalization surrounding it. Current thus continues to flow along the blade piece 14-1 to the next disk 16C, which again contains no metalization adjacent its slot 18-1.

Continuing along the stator body formed by the back iron 15, the current reaches disk 16-D at slot 18-1. At this radial position there is contained a portion of a metalization pad 19-1. The current thus enters the metalization pad 19-1 and is carried over to slot 18-4 in disk 16D. Although current will also continue down the remaining length of the blade piece 14-1, the corresponding slots 18-1 in disk 16E and 16F are in a ceramic portion of their respective disk, and therefore, no current will flow through them.

Thus, all of the current flowing in the blade piece 14-1 is turned around, in effect, by the metalization pad 19-1, and is now presented to the slot 18-4 in disk 16D. As indicated by the arrows in the drawing, the current then travels in the "up direction," returning to disk 16C at slot 18-4 and disk 16B at 18-4. At the radial slot 18-4, these disks 16C and 16B, again contain ceramic only. However, upon reaching slot 18-4 in disk 16A, a second metalization pad 19-2 is encountered in the disk 16A, causing the current to be forwarded to slot 18-7.

A second blade piece 14-4 inserted in the slots 18-4 associated with each of disks 16A through 16F then carries the current from the front to the back of the stator 12.

A second metalization pad 19-2 provides for yet another change in the current direction back towards the front of the stator 12. In this instance, current flows through the corresponding blade piece 14-7 through slots 18-7 in disks 16B and 16C until it encounters slot 18-7 in disk 16 adjacent metalization pad 19-3. Pad 19-3 causes current to again turn back towards the of the stator 12 until it reaches slot 18-10 in disk 16A. At this point, the current is turned around yet again and travels toward the front of the stator through blade 14-2 inserted in slots 18-13. Upon reaching disk 16D at slot 18-13, a final turn is made through metalization pad 19-5. The current makes its final trip back "up" through slots 18-16.

A final metalization pad 19-6 in disk 16A serves as a common connection point for the three phases of the motor which are connected in a "Y" electrical configuration. The pad 19-6 can either be allowed to electrically float or can be brought out to a case ground position.

Having described how one phase of the current path flows through the various blade pieces 14 and interconnect disks 16, it can be readily understood how the other metalization pads and slots 18 cooperate to provide the two other current phases.

It should also be appreciated that while FIG. 3 illustrates an arrangement of disks 16 and blades 14 that provides a three phase-single turn motor, other phase and multiple turn motors can be provided by appropriate arrangement of the pads 19.

Figure 4A:
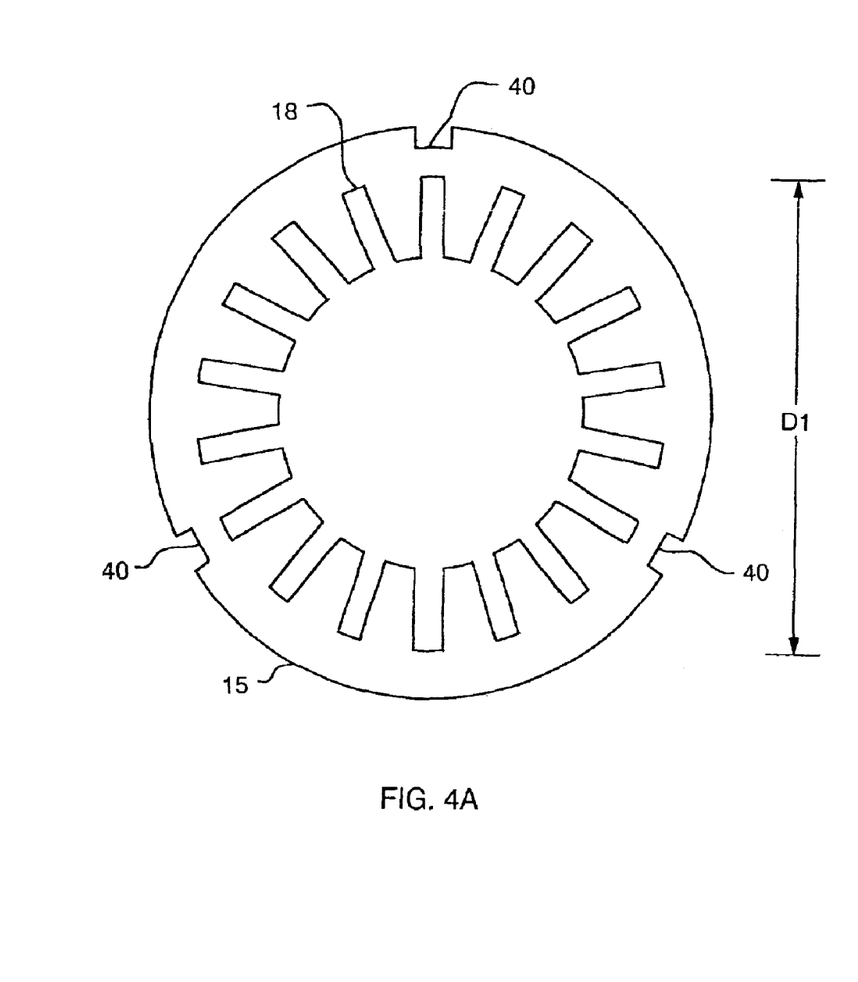
FIGS. 4A and 4B are respectively a plan view and cross-section view of a back iron washer from which the body of the stator is formed.
Figure 4B:
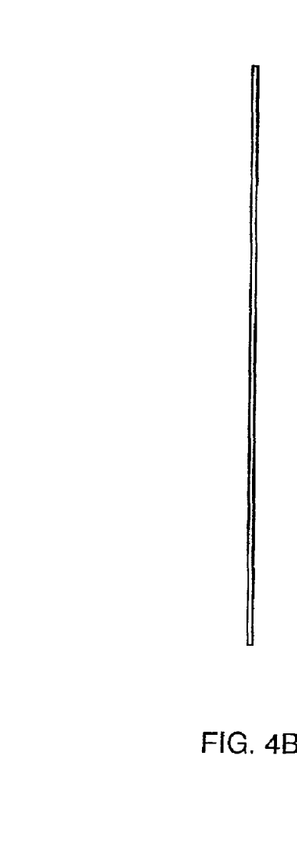

FIGS. 4A and 4B are a more detailed view of back iron washers 15. These washers are formed of a nickel iron alloy such as "Carpenter 49" or other suitable ferrous material. "Carpenter 49" is available from Carpenter Technology Corporation of Wyomissing, Pa. The back iron washers 15 are formed as annular rings of material having slots 18 on an inner diameter thereof, in the same manner that slots 18 were formed in the disks 16. The slots 18 are necessary to allow the blades 14 to pass through. Registration slots 40 may be formed in the outer diameter of the back iron washer 15 to assist with assembly and lamination process.

In the illustrated embodiment, each single back iron washer 15 has a thickness of approximately 0.010 inches. In a typical configuration, the back iron washers are built to lamination height of approximately 3 inches. The outer diameter for this motor is approximately 1.2 inches with a dimension D1 between the outboard ends of the slots 18 being approximately 1.01 inches. A motor of this size configured as shown is expected to provide approximately 1½ horsepower.

Figure 5A:
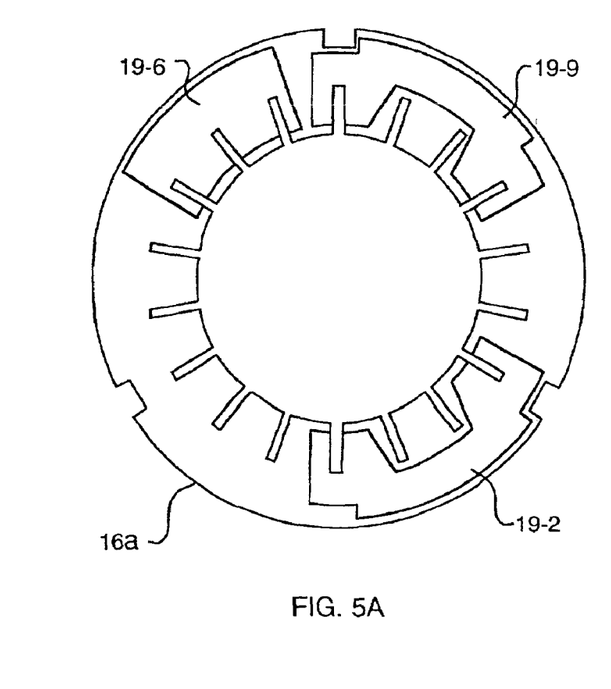
FIGS. 5A, 5B and 5C are front, cross-section, and rear views of a particular one of the interconnect disks.
Figure 5B:
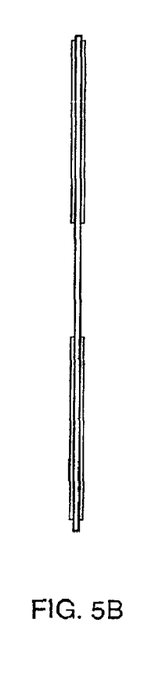
Figure 5C:
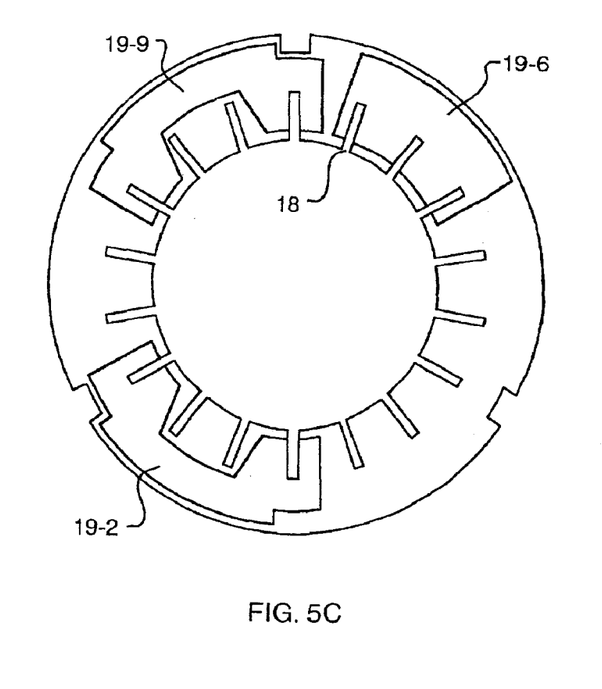

FIGS. 5A, 5B and 5C show one of the interconnect disks 16A in greater detail. As previously explained, the disks 16A includes eighteen slots 18 formed in the inner diameter. The disk 16A is formed of a suitable structurally rigid, thermally stable, insulating material such as a ceramic containing 96% alumina.

Metalization layers 19-2, 19-4 and 19-6 are formed on the face surfaces of the disk 16A. In a preferred embodiment, there are metalization layers 19 associated with each face of the disk 16A. Having conductive layers 19 on both sides of the disk 16 is not completely necessary for operation of the invention. However it is preferred, as this provides twice the current handling capability for given size of disk 16A.

Figure 6A:
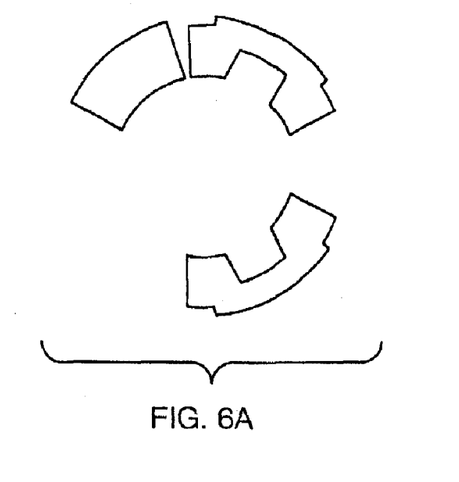
FIGS. 6A and 6B show metalization patterns for the interconnect disk.
Figure 6B:
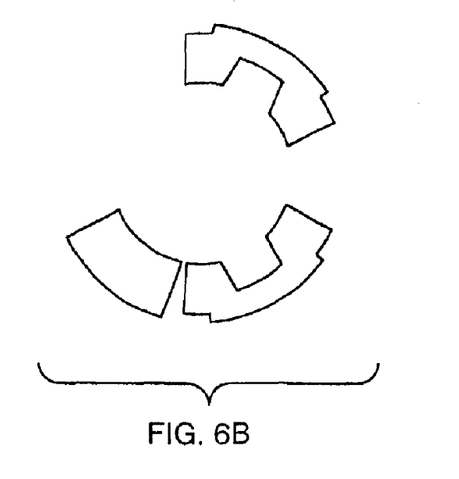

The metalization areas 19 may be formed in a number of ways such as by silver plating. A suitable set of art work images for such a process are shown in FIGS. 6A and 6B.

In the preferred embodiment there is also a conductive material layer braised to disk 16 to provide the metalization pads 19. In particular, the pads 19 may be formed by a conductive material patch 29.

Figure 7:
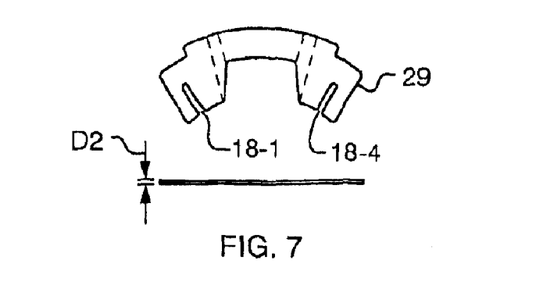
FIG. 7 is a more detailed view of conductive pad that is mounted to the interconnect disk to provide for interconnection between the blades.

A conductive patch 29 associated with pad 19-4 is shown in more detail in FIG. 7. The conductive patch 29 is formed in a desired shape, of course to accommodate the interconnection between the two conductive slots 18-4 and 18-7. The conductive patch 29 is formed of a composite conductive material such as a laminate of copper and molybdenum. In the preferred embodiment, this consists of a series of alternating layers of copper and molybdenum with copper being the two outer-most layers. By weight, the lamination is approximately 60% copper and 40% molybdenum. In the illustrated embodiment, the equal thickness layers of copper and molybdenum have a thickness dimension, D2, of approximately 0.005 inches.

Figure 8A:
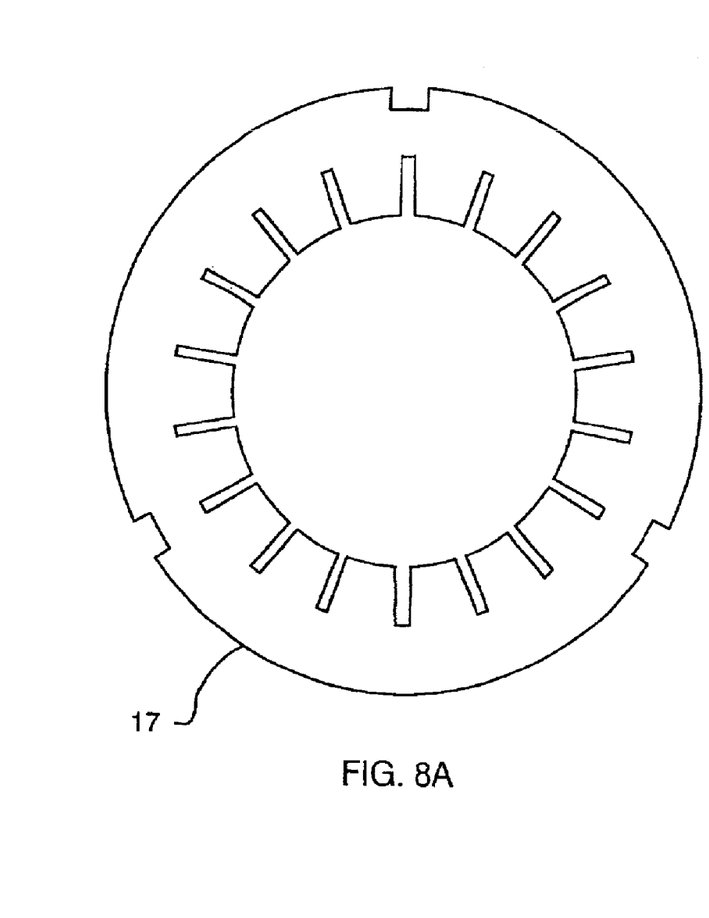
FIGS. 8A and 8B are a front and cross-section views of isolator disks.
Figure 8B:
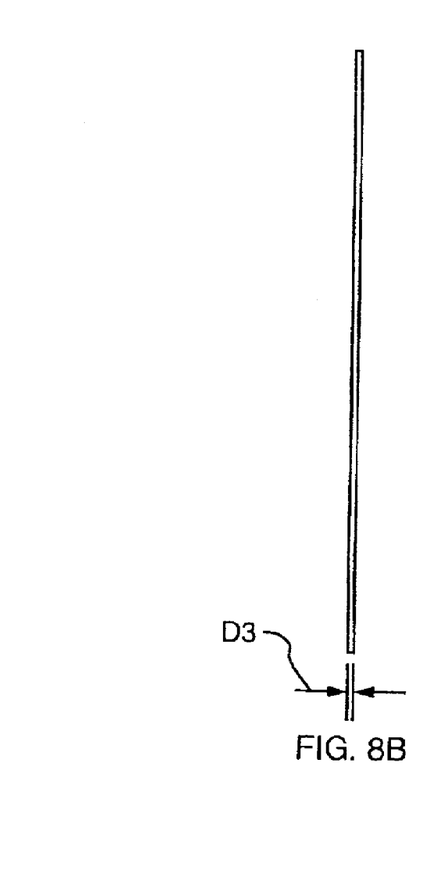
Figure 9A:
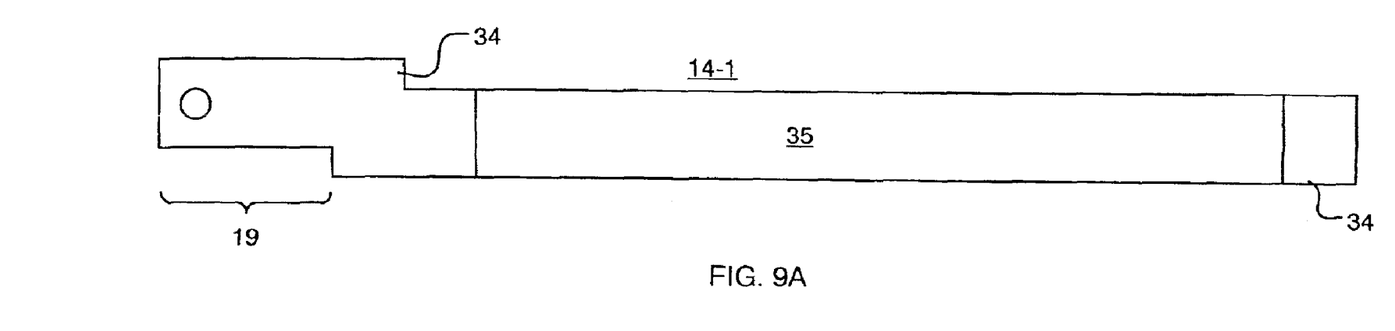
FIGS. 9A and 9B are plan and cross-section views of one type of blade having a stepped portion to provide an electrical connection to driver circuits.
Figure 9B:
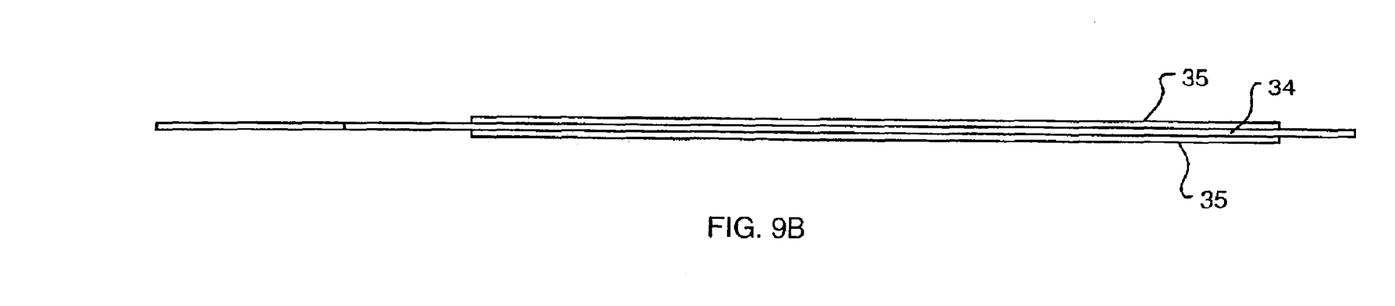

FIGS. 8A and 8B are a more detailed view of one of the insulator disks 17. The insulator disk 17 is formed of the same material used for the substrate of interconnect disk 16. However, the insulator disks 17 are a bit thinners with a dimension D3 of approximately 0.12 inches. They have the slots 18 formed therein, of course, to accommodate the blades 14, however they contain no metalization layers. Insulator disks 17 insulate the exposed metalization pads 19 of a respective interconnect disk 16, to keep the adjacent interconnect disks 16 from electrically shorting to one another. FIGS. 9A and 9B area more detailed view of a stepped blade piece 14-1. The stepped blade piece 14-1 is an electrically conductive unit that provides for current flow from one end of the stator assembly 12 to the other. The stepped blade 14-1 has a major portion consisting of a conductive blade 34. The conductive blade 34 is formed of a laminated conductive material such as the previously mentioned molybdenum and copper laminate. In this instance, a total thickness of 0.10 inches, as referenced by dimension by D4 can be provided by approximately 9 layers of material, again alternating the layers of copper and molybdenum.

The tab or step 19 in blade piece 14-1 is used as an extension to provide for connection to the electrical phase control circuitry.

Although the blade 14-1 can be formed entirely of this conductive material, in a preferred embodiment there is laminated on both sides thereof a insulator 35. The insulator 35 prevents the blade 14-1 from electrical contact with undesired portions of the stator assembly 12 and in particular the back iron disks 15. Thus, exposure of conductive material 34 is provided only on the ends of the blade 14-1 adjacent the front and rear ends of the state of assembly 12, where the slots 18 in the interconnect disks 16 are located.

Figure 10A:
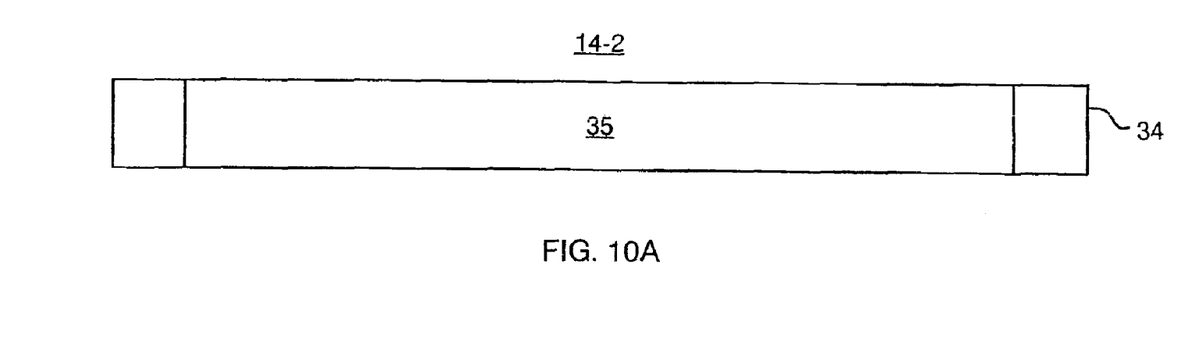
FIGS. 10A and 10B are views of a second type of blade that provides for current flow from one end of the stator to the other.
Figure 10B:
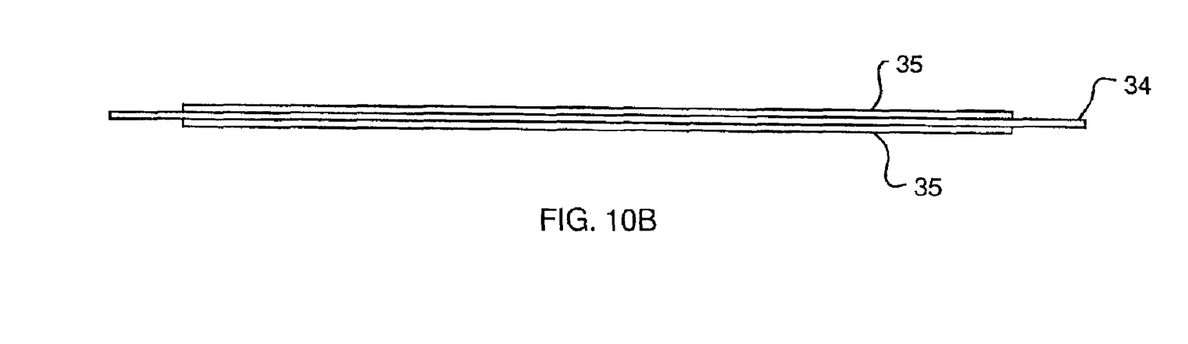

FIGS. 10A and 10B are more detailed views of a straight blade piece 14-2. These blade pieces 14-2 do not require the step 19, as they provide connection only between the disks 16 on either end of the stator 12, and do not need to provide connections out to the drive circuitry. The construction is otherwise the same as for the stepped blade piece 14-1, consisting of the conductive material 34 with outer insulating ceramic layers 35. The outer layers 35 may be formed from a suitable insulating ceramic which is brazed to the conductive portion 34.

We have found in practice that the use of the laminated conductive material for the blades 14 provide for superior performance. Brazing can be used to connect the conductive blade portions 14 to the ceramic molybdenum laminate presented by the disks 16. Because of the similarity in the coefficients of expansion of molybdenum and copper, the brasing process does not otherwise cause the laminations to separate as might otherwise be encountered with other materials.

Figure 11A:
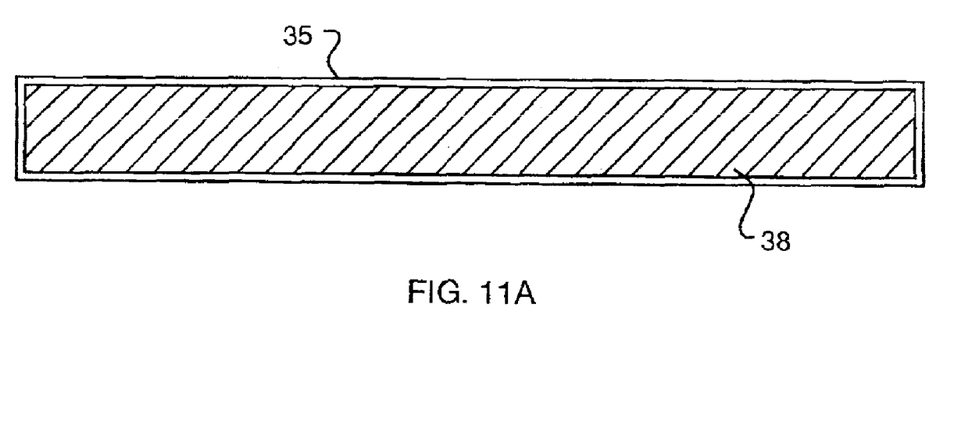
FIGS. 11A and 11B are a more detailed view of a insulator ceramic piece that is braised to the blades in a preferred embodiment.
Figure 11B:
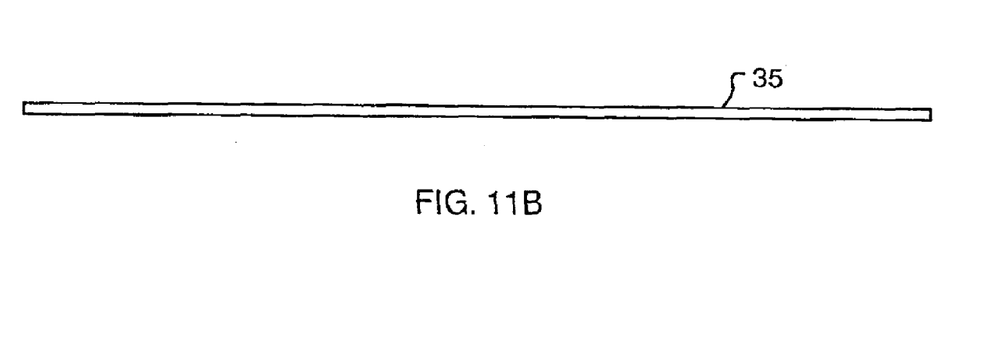

FIGS. 11A and 11B are a more detailed view of the insulator layer 35 used with the blade pieces 14-1 and 14-2. The layer 35 may be formed from a suitable ceramic material such as the 96% alumina previously described. A metalization layer 38 can be formed on one side thereof to assist in the braising process during assembly of the insulator layer to the blade pieces 14.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for making a stator for an electric machine comprising the steps of:

forming a magnetic core with plurality of axially arranged slots, the axially arranged slots formed about a center axis of the magnetic core;

positioning a plurality of conductive blades axially about the center axis of the magnetic core, each conductive blade therefore being disposed within a respective one of the slots formed in the magnetic core the conductive blades formed of a rigid conductive material;

disposing a common planar interconnect structure at one end of the conductive blades, and brazing the common planar interconnect structure to the plurality of conductive blades to provide electrical interconnections for current flow through the blades in a desired number of turns and phases, and thereby supporting the conductive blades within their respective slots without mechanically contacting the core, such that an electromagnetic field generated by current flow through the blades operates of the electric machine.

2. A method as in claim 1 wherein the step of providing a common planar interconnect structure comprises the step of providing a disc shaped material.

3. A method as in claim 2 wherein the disc shaped material is formed using the step of:

providing an insulating material as a substrate; and forming a conductive pads on the insulating substrate in selected locations where the conductive blades are expected to contact the planar interconnect structure in the completed assembly.

4. A method as in claim 1 wherein the blades are formed of a copper molybdenum laminate.

5. A method according to the process of claim 1 wherein the interconnect structure has conductive portions formed of a copper molybdenum laminate.

6. A method as in claim 1 wherein the blades are formed by a step of:

forming insulation along a central portion of the blade.

7. A method as in claim 1 additionally comprising the step of:

forming metalization on both sides of the interconnect structure.

8. A method as in claim 1 additionally comprising the step of:

forming an electric motor disposing a rotor arranged to rotate freely about the central axis of the stator.

9. A method as in claim 8 wherein the interconnect structure provides a three phase single turn motor.

10. A method as in claim 1 comprising the step of forming an electric generator by disposing a rotor to rotate freely about the central axis within the stator.

11. A method as in claim 1 additionally comprising the step of:

forming a stator body by laminating a plurality of back iron disks together.

12. A method as in claim 1 where after braizing the conductive blades to the interconnect structure, the assembly is sufficiently rigid so as to be supported only at respective ends thereof.

* * * * *

UNITED STATES PATENT AND TRADEMARK OFFICE
CERTIFICATE OF CORRECTION

PATENT NO. : 6,889,420 B2
DATED : May 10, 2005
INVENTOR(S) : Robert M. Jones

It is certified that error appears in the above-identified patent and that said Letters Patent is hereby corrected as shown below:

Title page,
Item [54], Title, delete "METHOD FOR MAKING A STATOR FOR AN ELECTRIC MACHINE" and insert -- ELECTRIC MACHINE USING COMPOSITE BLADE STRUCTURE --

Column 7,
Line 14, delete "electromagnetic" and insert -- electro-magnetic --

Signed and Sealed this

Nineteenth Day of July, 2005

JON W. DUDAS
*Director of the United States Patent and Trademark Office*